Sept. 21, 1965          C. J. SLAGA          3,206,921
GARDEN RAKE ATTACHMENT
Filed July 9, 1963
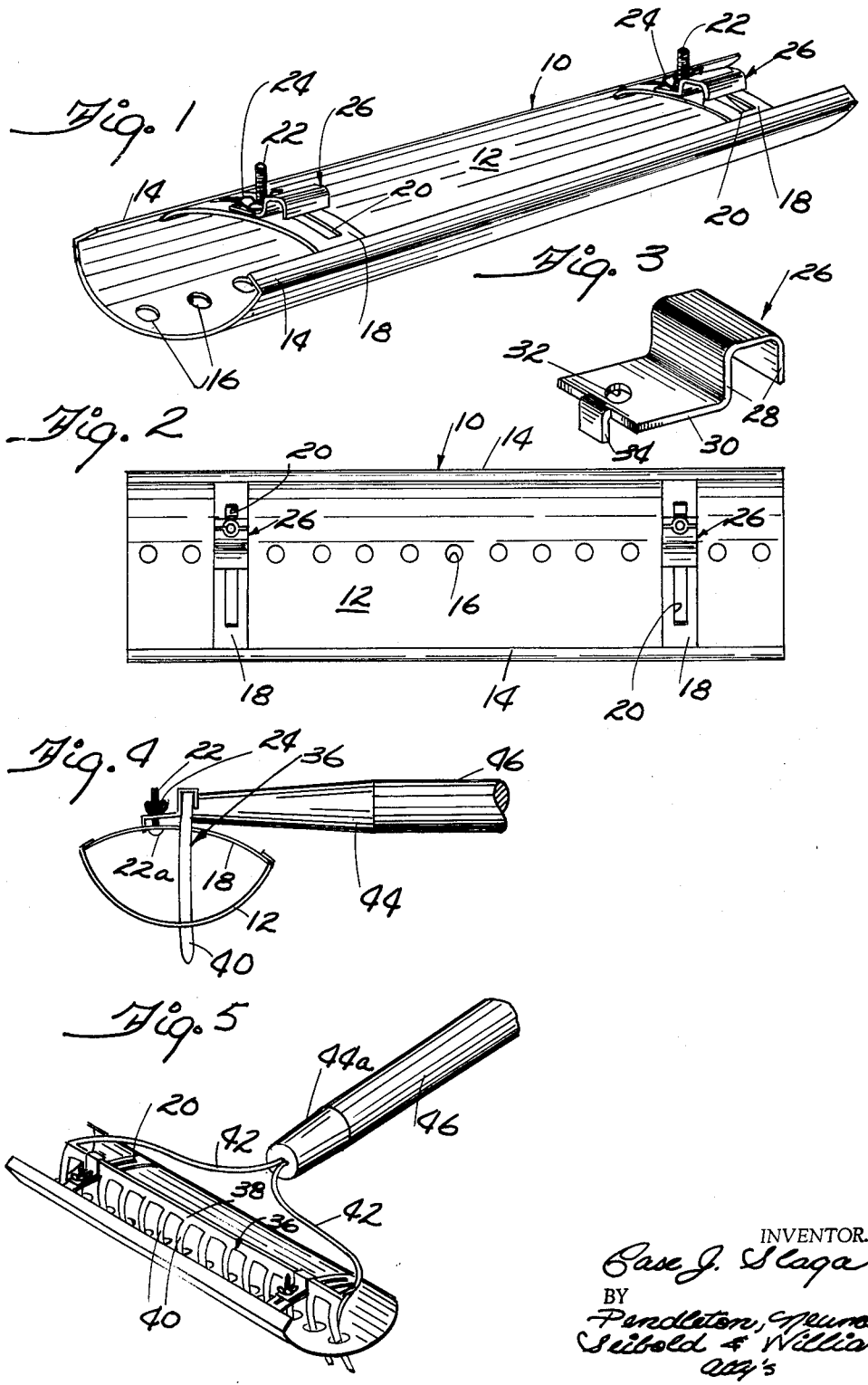

United States Patent Office 3,206,921
Patented Sept. 21, 1965

3,206,921
GARDEN RAKE ATTACHMENT
Case J. Slaga, Lombard, Ill., assignor to Advertising Metal Display Co., Cicero, Ill., a corporation of Illinois
Filed July 9, 1963, Ser. No. 293,684
4 Claims. (Cl. 56—400.07)

This invention relates to a rake attachment and more particularly pertains to a housing for a rake head which shortens the effective length of rake teeth for certain raking purposes.

Rakes are utilized in a large number of sizes and models in which the rake teeth vary somewhat in configuration. Substantially all of the various rake models possess teeth which for certain usages are too long. For example, in working seed into the ground it is often desirable, if not necessary, to merely cover the seed with a thin layer of overyling soil. In such instances, to assure proper covering of the seed, the person manipulating the rake must support the same so that only a fraction of the length of the rake teeth will dig into the soil.

Inasmuch as rake heads are normally formed of steel of about ¼ inch thickness and attached to the end of a handle which itself may be of substantial weight, proper support of the rake so that only a portion of the teeth length depends into the soil may prove to be physically exhausting after a short period of time. Also, the proper depth of teeth penetration into the soil may be very difficult to regulate and a non-uniform working of the soil is sure to result.

In accordance with this invention a rake attachment of simple construction is provided which may readily be attached to a rake head for purposes of rendering the exposed length of such rake teeth suitable for seeding purposes.

It is an object of this invention, therefore, to provide an attachment which may be secured to a rake head for purposes of shortening the effective length of the rake teeth.

It is another object of this invention to provide an attachment for a rake head which is composed of a minimum number of parts, may be readily attached or detached from the rake head, and is inexpensive to manufacture.

It is a still further object of this invention to provide an attachment for a rake head which possesses an outer surface of curvilinear cross section adapted to smooth the soil after the same has been worked by the rake teeth.

The above and other objects of this invention will become apparent from the following detailed description when read in the light of the accompanying drawing and appended claims.

In one embodiment of this invention an attachment for a rake head comprising an elongate sheet-like metal member of curvilinear cross section is provided having a plurality of aligned apertures disposed in a bottom portion thereof. The attachment is preferably formed with opposed inwardly projecting lip portions defining the opposed longitudinal edges of the attachment to which spaced rake-supporting metal straps may be secured, as by spot-welding or the like. The straps span the interval between the attachment lip portions and are disposed at substantially right angles thereto.

Each strap is centrally slotted and may be slightly upwardly bowed away from the underlying concave bottom of the attachment. It is the function of the spaced straps to engage spaced rake-head header portions defining the interval between two rake teeth which straddle each strap in the normal position of rake-attachment assembly. The straps thus serve to space the elongate header portion of the rake head from which the teeth depend in desired relation with the underlying, apertured attachment bottom. Consequently, only desired lengths of the rake teeth project through the attachment bottom. Clamps comprising inverted U-shaped clamp portions integrally formed with a base lug portion function to secure the rake head to the attachment. Nut and bolt assemblies adjustably position the clamps on the slotted straps, as will hereinafter be described in greater detail.

For a more complete understanding of this invention, reference will now be made to the drawing, wherein:

FIGURE 1 is a perspective view of a rake attachment made in accordance with the teaching of this invention;

FIG. 2 is a top plan view of the attachment illustrated in FIG. 1;

FIG. 3 is a perspective view of a clamp member utilized in the attachment, illustrated on an enlarged scale;

FIG. 4 is a fragmentary side elevational view of a rake attachment made in accordance with the teaching of this invention illustrated in assembled relationship with a level head rake; and FIG. 5 is a perspective view of a rake attachment made in accordance with the teaching of this invention illustrated in assembled relationship with a round bow rake.

Referring now more particularly to FIG. 1, an attachment 10 adapted to be readily secured to the heads of rake members normally employed for lawn and garden use is illustrated. Although the attachment is intended to be utilized primarily in conjunction with rakes normally employed for gardening purposes, the construction of the same is such that it may be employed with rakes of various types, such as rakes employed in industry if it is desired to use such rakes for seeding purposes in the garden.

The attachment 10 comprises an elongate sheet-like body 12 of curvilinear cross section, the distal longitudinal end limits of the body being defined by the edge portions 14 which are inwardly bent so as to define inwardly and slightly upwardly projecting strips. It will be noted from FIGS. 1 and 2 that a plurality of regularly spaced apertures 16 are disposed in the bottom portion of the attachment body 12. The apertures 16 may either be arranged along a longitudinal axis disposed in the center of the attachment body bottom, or the apertures 16 may be arranged along an axis slightly offset from the center of the bottom, as illustrated in the drawing, for reasons which will hereinafter become apparent.

Secured to spaced portions of the inwardly projecting strips or edge portions 14 of the attachment 10 are transversely disposed strap members 18 which may be secured by spot-welding or the like to undersurface portions of the strips 14, as illustrated. It will be noted from FIGS. 1, 2 and 5 that each of the straps 18 has a central elongate slot 20 in which a fastener means, particularly a bolt 22, may adjustably move; as seen more clearly in FIG. 4, head 22a of bolt 22 is of a greater diameter than the width of the slot 20 through which the shank portion of the bolt protrudes. Each bolt is retained in assembled relationship with strap 18 by means of wing nut 24. It is the function of the nut and bolt assembly illustrated to adjustably position and retain a clamp member 26, more clearly seen in FIG. 3, to the upper surface of each of the straps 18.

Each clamp 26 comprises an inverted U-shaped portion 28 which is integrally formed with a contiguous lug portion 30. Lug portion 30 is apertured, as at 32, for passage of bolt member 22 and has a tongue 34 formed integrally with and depending from the distal edge thereof disposed away from the clamp portion 28.

Each clamp tongue 34 is of a width adapted to be snugly received in slot 20 of a strap 18. Tongues 34 accordingly prevent rotational movement of the clamp member 26 when assembled with the strap 18, bolt 22 and nut 24 in the manner illustrated in FIGS. 1, 2, 4 and 5 of the drawing. It is the function of the clamps 26 to retain a rake head, such as rake head 36 illustrated in FIGS. 4 and 5, in tight, rattle-free relationship with the attachment 10.

The rake heads 36 of level head and round bar rakes of FIGS. 4 and 5, respectively, are of a construction commonly found in garden rakes, each comprising an elongate header portion 38 from which slightly curved projecting teeth 40 extend at substantially right angles. Inasmuch as the interval between rake teeth is substantially uniform, it is possible to form apertures 16 in the attachment body 12 so that the apertures will accommodate the teeth of a large number of rake models. Also, because of the substantially universally-uniform interval between projecting teeth of rake members, the straps 18 are formed so that the same are snugly received in an inter-tooth interval in the manner illustrated in FIG. 5 without significant, if any, permissible relative movement between the rake and the straps 18.

As seen in FIG. 4, rake head 36 engages a ferrule 44 which is affixed to a handle 46. In FIG. 5, rake head 36 engages connecting wire portions 42 which serve to connect the header and tooth assembly to ferrule 44a, which is secured to wooden handle 46 by means of a pin or other equivalent securing means.

In the normal course of assembly of the rake attachment 10 to a rake head, the clamps 26 are raised from underlying straps 18 until sufficient clearance is provided to enable the upper edge portion of the rake head elongate header portion 38 to slip under and interfit with the U-shaped pocket portions 28 of each clamp member 26. The latter interfitting step is effected after the rake teeth 40 have been inserted in the attachment body apertures 16 and the header portion 38 of the rake head 36 has been lowered into supported engagement with the spaced straps 18.

After the rake header portion 38 is disposed in supported relationship on the straps 18 and is disposed in the open-pocket portions 28 of clamp members 26, the wing nuts 24 of the nut and bolt assemblies are drawn tight so that elongate header portion 38 of the rake head is tightly urged against the spaced supporting straps 18 in the manner illustrated in FIGS. 4 and 5. Under such conditions the assembly is rattle-free and the attachment and rake head are manipulated as an integral unit.

It will be noted from FIG. 4 that in the interlocked condition the tongue 34 of each clamp 26 is of sufficient length so that even when the clamp lug portion 30 is raised from the underlying strap 18 because of the clamp engagement with the rake header portion 38, the tongue will depend into the strap slot 20 preventing rotational movement of each clamp 26 when the rake and attachment are in a normal position of assembly.

It is seen from FIGS. 4 and 5 that the attachment 10 serves to decrease the effective length of the rake teeth 40 to a fraction of their actual length. The exposed tooth length illustrated in FIGS. 4 and 5 is particularly desirable for seeding purposes when it is desired to cover newly planted seed with a thin layer of dirt. It will also be apparent from FIGS. 4 and 5 of the drawing that the curved outer surface of the attachment body 10 enables such outer surface to function as a soil-smoothing device which may be utilized to smooth and pack the previously-raked soil back into place after the teeth 40 have passed therethrough.

By predetermined selection of the axis along which apertures 16 are formed in the bottom of the attachment body 10, the surface portion of the attachment body exterior available for smoothing purposes may be increased or decreased. For instance, it is apparent from FIG. 4 that as the axis of the apertures 16 moves to the right, the teeth 40 will depend into the underlying soil smaller vertical distances if the rake is held at its normal angle of use and greater surface portions of the outer surface of the attachment housing 12 will be available for dirt-smoothing purposes. However, as the aperture axis moves to the left, a greater length of the rake teeth will depend vertically into the soil being worked, assuming that the illustrated rake member is applied to the attachment in the manner illustrated with the rake handle extending to the right.

It will be appreciated that if the apertures 16 are off-center in the manner illustrated and more clearly seen in FIGS. 2 and 4, it is possible to reverse the direction of extension of the rake handle from the attachment 10 so that in one condition of assembly, the available length of the teeth 40 will be greater for soil-processing purposes than in the other position. Thus, it is seen from FIG. 4 that if the rake were assembled with the illustrated attachment so that the handle 46 of the rake extended to the left, a greater portion of the available length of the rake teeth 40 would depend into the ground than would if the assembly of FIG. 4 were utilized, assuming that the rake-attachment assembly were utilized with the rake handle at substantially the same angles of use. As is most evident from FIGS. 4 and 5 of the drawing, the apertures 16 are of such diameter and the straps 18 are bowed to the degree that some adjustability of the effective length of the rake teeth 40 projecting through the attachment bottom may be obtained by varying the position of the clamps 26 relative to the straps.

It is seen from the drawing that despite the open nature of the attachment, the same is not susceptible to the accumulation of dirt or other debris in the concave portion thereof. Inwardly projecting strip portions 14 assist in keeping dirt and other material out of the body portion interior in the normal course of use.

Although the illustrated attachment has been described as being formed of metal, it may of course also be formed of rigid plastics which possess desired strength for the purposes indicated.

Various structural modifications or substitutions may be effected in the illustrated attachment which will not withdraw the resulting construction from the ambit of the invention disclosed. For instance, it is apparent that a large variety of clamp means may be employed for purposes of securing the rake head to the attachment. It is also apparent that the specific cross section of the attachment is not of critical importance, although it is obviously desirable to employ an elongate curved body portion which is at least partially convex on its exterior surface for purposes of performing a smoothing operation in the normal course of attachment use.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An attachment for a garden rake having a rake head and attached handle comprising a trough-shaped member, said member comprising a pair of essentially parallel edge portions and an interconnecting trough portion of arcuate cross section containing a plurality of regularly spaced apertures centrally disposed in said trough in substantially parallel relation with the side portions, said apertures in said trough being straddled by arcuate sections of said trough portion, a pair of arcuately shaped rake-head-supporting members supportably disposed in transverse relationship on said edge portions, and movable means adapted to secure a rake head to the arcuately shaped members.

2. The attachment of claim 1 in which said edges are upwardly and inwardly slanted toward the central longitudinal axis of said attachment whereby passage of foreign material into the interior of said trough-portion is maintained at a minimum.

3. In combination, a rake including a rake head having a header portion and a plurality of aligned projecting teeth extending from said header portion, and handle means extending from said rake head; a housing for said rake head having a plurality of aligned apertures formed in the bottom thereof in which said teeth are received, spaced means mounted on said housing for engaging spaced header portions of said rake head from which said teeth project spanning the housing bottom, each of said spaced means having a width substantially equal to the interval between adjacent teeth of said rake whereby spaced header portions may be engaged thereby with little permissible lateral movement between said rake head and the header-engaging means; and clamp means adjustably positionable along the length of each of said spaced means for urging the header portion of said rake into tight abutting relation with each of said spaced means.

4. A rake attachment for decreasing the effective length of rake teeth projecting from a rake head comprising a housing of general curvilinear cross-sectional configuration having a plurality of aligned apertures in a bottom portion thereof through which rake teeth may project, means overlying said housing bottom for supporting a rake head so as to fix the interval between the distal ends of said projecting teeth and said housing bottom, said rake head-supporting means comprising a pair of spaced, slotted straps secured to opposed longitudinal edge portions of said housing, and means for securing a rake head to the rake head-supporting means, the rake head-securing means comprising a pair of members, each of which has a substantially U-shaped clamp portion integrally formed with a flat base; said base having a tongue extending therefrom at substantially right angles and projecting from said base in a direction away from said U-shaped clamp; said tongue being snugly received in the slot of one of said straps whereby turning of said securing means while mounted on said straps is prevented.

References Cited by the Examiner

UNITED STATES PATENTS

| | | | |
|---|---|---|---|
| 1,430,227 | 9/22 | Hamilton | 56—400.1 |
| 1,467,212 | 9/23 | Walsh | 56—400.14 |
| 1,678,695 | 7/28 | Ferguson | 56—400.01 X |
| 1,859,179 | 5/32 | Strahm | 56—400.09 |
| 1,871,084 | 8/32 | Reiter | 56—400.08 |
| 2,225,108 | 12/40 | Glascock | 172—375 X |
| 2,887,170 | 5/59 | Fenicchia | 56—400.05 |

ANTONIO F. GUIDA, *Acting Primary Examiner.*

T. GRAHAM CRAVER, *Examiner.*